(12) United States Patent
Boullin et al.

(10) Patent No.: US 6,808,732 B2
(45) Date of Patent: Oct. 26, 2004

(54) PROCESS FOR PRODUCING A DEHYDRATED FOOD PRODUCT FROM A WET PLANT MATERIAL

(75) Inventors: Anne Boullin, Exideuil (FR); Philippe Filleau, Saint-Medard-D'Exideuil (FR); Denis Megard, Saint-Brice-en-Cogles (FR)

(73) Assignee: Diana Ingredients, Saint Nolff (FR)

( * ) Notice: Subject to any disclaimer, the term of this patent is extended or adjusted under 35 U.S.C. 154(b) by 501 days.

(21) Appl. No.: 09/908,980

(22) Filed: Jul. 20, 2001

(65) Prior Publication Data
US 2002/0034578 A1 Mar. 21, 2002

(30) Foreign Application Priority Data
Jul. 21, 2000 (FR) .............................. 00 09564

(51) Int. Cl.[7] .............................. A23L 1/212
(52) U.S. Cl. .................. 426/471; 426/457; 426/640
(58) Field of Search ............................ 426/443, 457, 426/471, 615, 640

(56) References Cited

U.S. PATENT DOCUMENTS 1,908,489 A * 5/1933 Sartakoff .................. 426/457
4,417,405 A * 11/1983 Fuller, Jr. .................. 426/457

FOREIGN PATENT DOCUMENTS

| EP | 0 409 138 A1 | 1/1991 |
|---|---|---|
| EP | 0 449 005 A1 | 10/1991 |
| EP | 0 830 820 B1 | 3/1998 |
| FR | 746 255 A | 5/1933 |
| FR | 1 364 898 A | 10/1964 |
| FR | 2 796 814 A | 2/2001 |
| GB | 923 252 A | 4/1963 |
| GB | 938 381 A | 10/1963 |
| GB | 1 059 609 A | 2/1967 |

OTHER PUBLICATIONS

Nielsen, Jette, Roller–Drying of Fatty Fishes, Lebensmittel-Wissenschaft und Technol., 1984, vol. 17, No. 3, 151–154 pp, U.S. Department of Agriculture.

* cited by examiner

Primary Examiner—George C. Yeung
(74) Attorney, Agent, or Firm—Foley & Lardner LLP

(57) ABSTRACT

The invention relates to a process for producing a dehydrated food product from a wet plant material (MH), in particular in juice or purée form, by drying the said material in the form of a thin layer (CF) on a hot wall. This process is remarkable by the fact that a film consisting of vegetable oil (HV) is distributed on the said wall (1) before depositing thereon the thin film (CF) to be dried. It makes it possible to obtain a dry product, in particular in the form of smooth and bright flakes.

10 Claims, 2 Drawing Sheets

PROCESS FOR PRODUCING A DEHYDRATED FOOD PRODUCT FROM A WET PLANT MATERIAL

The present invention relates to a process for producing a food product in powdered, granule or flake form, by drying a wet plant material in the form of a thin layer on a hot wall, in particular on the wall of a heating roller—or a pair of rollers.

The expression "plant material" will be understood to mean in the present description, and in the claims which follow, an edible plant—or plant portion, or a mixture of several plants, in particular of fruits, vegetables, mushrooms, cereals, herbs, and in general any plants which can serve for human consumption and/or as animal feed.

The purée and the juice which constitute the starting material may be obtained in particular by grinding, refining, blending and/or pressing of the plants in question, for example by grinding the pulp in the case of a fruit.

The dehydration of the material is carried out traditionally on the wall of a rotating cylindrical drum, with a horizontal axis rotating at low speed, in general made of chrome-plated metal.

The drum is internally heated, and possesses a heated metal wall on which the material to be dehydrated is continuously spread, such that it forms a thin and uniform layer thereon.

The temperature and the speed of rotation of the drum are chosen such that the desired drying is obtained before a complete revolution.

The dry product forms a film which is then recovered, still continuously, by scraping the wall, upstream of the point of deposition of the material to be treated.

This well-known technique is generally called "coating" technique.

In a variant, the material is applied against the drum, during the treatment, by means of one or more, also rotating, press rollers—called "satellites".

Another known technique, to which the present invention also applies, consists in passing the material between two press cylinders with heated walls, also made of chrome-plated metal, placed side by side, with their axes parallel and situated in the same horizontal plane.

The two cylinders rotate in opposite directions, their opposite generating lines being at a short distance from each other, and moving from the top downwards.

The material which is poured between the two rollers is therefore subjected to laminating, and forms a fine layer which is gradually dehydrated on the heated rollers.

These various techniques may be used both at atmospheric pressure and under vacuum; they make it possible to obtain rapid drying of the material.

Such processes are commonly used for drying juice and/or purée from fruit, vegetables or cereals, for the production of powder, granules, fine flakes, flakes and chips entering into the production of a wide range of food products, among which there may be mentioned, by way of examples, baby foods, mueslis, biscuit fillings, and dehydrated soups.

Except for a few rare exceptions, such as, for example banana and potato, which are very rich in starch, the starting materials cannot be treated as they are.

It is necessary to incorporate a drying aid therein.

This is particularly true for plants which are rich in sugar.

In the absence of an aid, the material sticks to the drum, or to the laminating cylinders, as well as to the scraping blade and a sticking phenomenon, or even caramelization of the product, is observed which is difficult to detach from the hot wall causing dehydration; the product obtained is of poor quality, both from the taste point of view and from the point of view of its appearance.

This sticking, which is accompanied by the appearance of black spots, is observed even when chrome-plated cylinders are used because of the high content of sugar in the mixtures to be dehydrated.

Traditionally, the aids which are used, to allow dehydration under good conditions, are composed of two components, namely a texturing agent and a lubricant.

The role of the texturing agent is to give the mixture substance, and to promote its deposition in the form of uniform layers on the heating wall, by increasing the level of dry matter in the mixture.

Its role is also—where appropriate—to confer a degree of unctuousness on the final product, when the latter is intended to be rehydrated before consumption.

The addition of this texturing agent is often essential, with the exception of certain specific plant applications, for example apple.

The percentage of texturing agent, depending on the applications, may be up to 70% by weight of dry matter content of the mixture.

As drying base, flour or starch from wheat, maize or rice is customarily used.

The lubricating agent traditionally used is soya bean lecithin.

Its role is to lubricate the roller, in order to avoid the mixture sticking to the hot wall thereof, and allows detachment of the dry product at the scraping blade, serving to extract the dehydrated product at the end of the treatment.

Soya bean lecithin also makes it possible to obtain a bright flake, with a pleasant appearance.

The lecithin dose traditionally used is between 0.5 and 1.5% by dry weight of the mixture.

With the exception of a few fruits and vegetables which are very rich in starch, such as banana and potato, soya bean lecithin is an ingredient which is judged to be essential in all formulas for the manufacture of flakes of plant materials having regular forms, with a bright appearance and with a uniform quality.

The object of the present invention is to provide a process for producing a dehydrated food product from a wet plant material, in particular in juice or purée form, by drying the said material in the form of a thin layer on a hot wall, which can dispense with soya bean lecithin as lubricating agent and as drying aid.

This interest to dispense with the use of soya bean lecithin results from considerations linked to the development of certain genetically modified raw materials, including soya bean, which does not offer the consumer complete assurance with regard to its natural character. In Europe, many manufacturers no longer wish to use ingredients containing, or likely to contain, genetically modified raw materials (maize and soya bean).

It may be thought that this will lead, in the short to medium term, to ingredients derived from the soya bean sector in food products being purely and simply banned.

The constraints which the Applicant imposed on itself in the search for a method of substitution were in particular the following:
  use of a wholly plant and natural product;
  use of a product exhibiting no risk of the presence of allergenic agents;
  use of a product which is effective regardless of the plant material to be treated, and regardless of the formulation—with or without texturing agent—;

possibility of using in any applications, including for the preparation of baby foods;

use of a product not considered as a food additive requiring labelling with an "E" code;

absence of lecithin, in particular soya bean lecithin.

Apart from these constraints, the invention of course set itself the objective of providing a process using a lubricating agent possessing the same properties, or practically the same properties, as soya bean lecithin as regards lubricating the roller and allowing effective detachment of the dry product film at the scraping blade and as regards the production of a dry product such as a flake, with a bright appearance and with a homogeneous quality.

Another imperative was also to search for a process using a product whose taste is neutral, so as not to influence the taste of the final product.

It was indeed suggested, to respond to these expectations, to incorporate fat, such as oil, directly into the product to be dried.

The introduction of fat before drying on a roller into mixtures rich in emulsifying proteins is possible. It is in particular the case for formulas with vegetable milk (EP-A-0 830 820), with goat milk (EP-A-0 409 138) or with animal products (Nielsen, 1984, Lebensmittel-Wissenschaft und Technol.), 17(3) 151–154).

On the other hand, in vegetable mixtures which are naturally not very rich in proteins, it is impossible to homogeneously incorporate vegetable oil. Whatever the quality of the mixture, the oil is not homogeneously distributed in the aqueous mixture (purée and/or juice with or without texturing agent) and there is partial phase separation during storage before drying. This phase separation is more or less rapid depending on the temperature of the mixture to be dried, and it may also occur if the mixture is pasteurized before the coating.

Surprisingly and unexpectedly, the Applicant has realized that the various objectives detailed above are achieved by distributing (by spreading) on the wall, during the whole drying operation, before depositing thereon the thin layer to be dried, a film exclusively composed of vegetable oil. According to an important characteristic of the invention, the process is used without addition of lecithin, in particular without addition of soya bean lecithin.

The quantity of oil distributed may be reduced. It is however sufficient to fulfil its role as lubricating agent and as drying aid.

This is particularly advantageous because the products treated naturally contain only very little fat, the quantity of oil which they are capable of absorbing through contact with the film will also be greatly reduced.

Moreover, according to other advantageous but nonlimiting characteristics of this process, the said drying is carried out on the outer wall of at least one rotating cylinder;

the quantity of oil deposited is at most 1%, and preferably 0.5% by weight, relative to the weight of the dry matter;

the said spreading of oil is carried out by coating the wall with the aid of a roller;

the said spreading of oil is carried out by spraying, in particular micro-spraying;

there are distributed about 5 to 50, and preferably 10 to 20 g of oil/hour/m$^2$ of wall;

the film of vegetable oil is distributed intermittently;

palm oil is used;

the wet plant material is a fruit and/or vegetable purée.

The term "micro-spraying" is understood to mean spraying an extremely small quantity of oil, in the form of a mist, so as to deposit on the wall a film which is as thin as possible.

Other characteristics and advantages of the present invention will emerge from the detailed reading which follows of some preferred embodiments. This description will be made with reference to the accompanying drawings in which.

Figure 1:
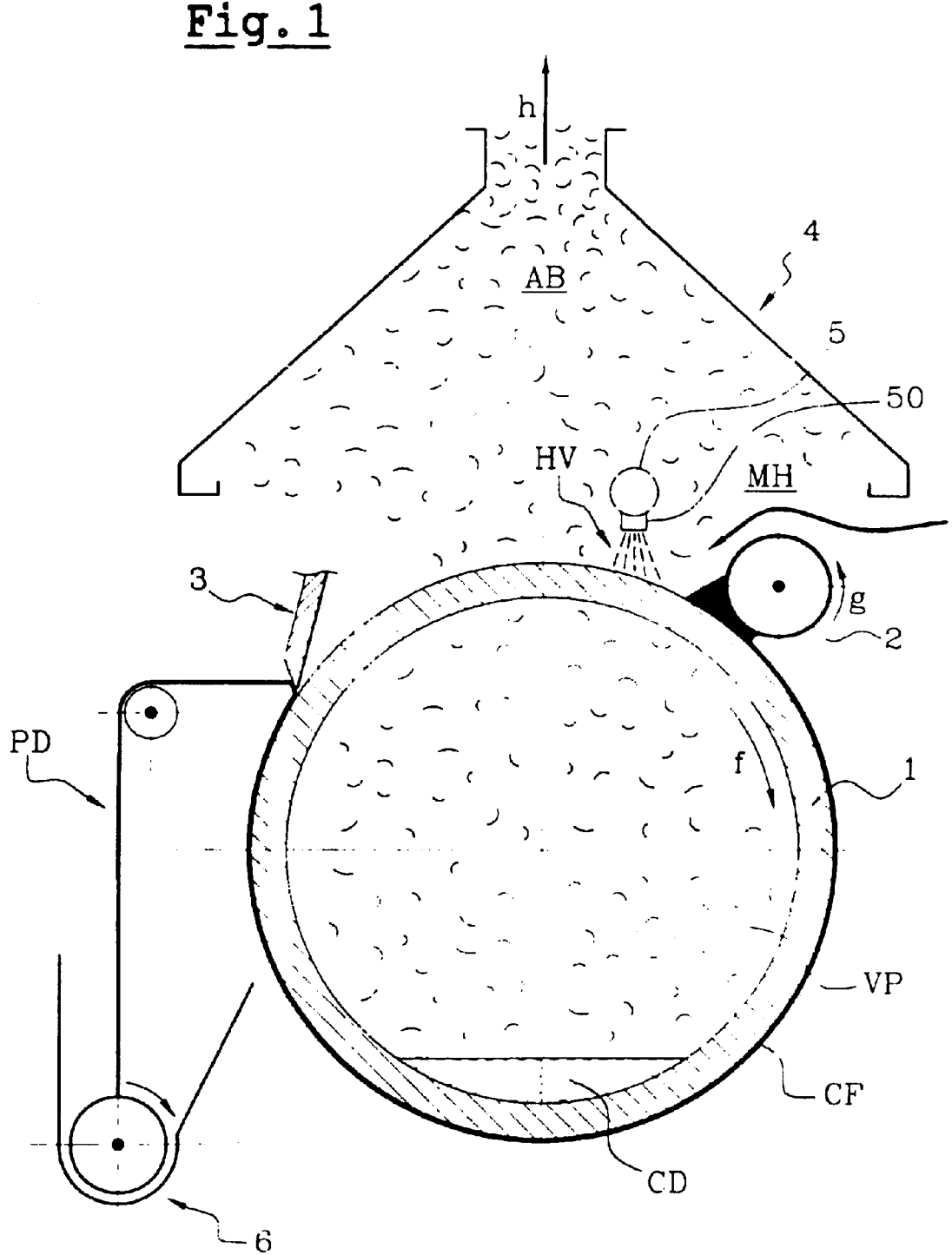
FIG. 1 is a skeleton diagram of a drying arrangement on a cylinder, which can serve for carrying out the process according to the invention.

In FIG. 1, a drying device on cylinder of a known type, has been very diagrammatically represented.

The device comprises a hollow cylinder 1 with a metal wall, a horizontal axis, which is driven in rotation, at uniform speed, as symbolized by the arrow f.

Reference 2 represents a satellite roller, whose direction of rotation is symbolized by the arrow g.

Satellite 2 is arranged in the top region and in the vicinity of the cylinder 1. Preferably, the two cylinders 1, 2 are chrome-plated.

The wet material to be treated, designated by the reference MH, is poured in the top portion of cylinder 1.

Its wall is heated by steam VP introduced inside the cylinder.

The condensate is designated by the reference CD.

By virtue of the presence of satellite 2, the material is uniformly and homogeneously spread over the whole length of the cylinder, forming a uniform and fine layer CF.

This layer adheres to the hot wall of the cylinder, and becomes gradually dehydrated during the rotation.

After approximately three quarters of a rotation, the material is dry and the dehydrated product is removed from the wall of the cylinder by means of a scraping blade 3.

The dehydrated product PD, still in the form of a film, is recovered and discharged, to a rotating shredding screw 6, which converts it to flakes, and transversely transfers it.

A hood 4 capable of recovering the mixture of air and damp vapour AB generated during the treatment, and of discharging it upwards, as symbolized by the arrow h, is provided above the cylinder.

As a guide, the speed of rotation of the cylinder is between 1 and 6 revolutions per minute and preferably between 2 and 4 revolutions per minute, which corresponds to drying times of between 5 and 60 seconds depending on the diameter of the cylinder.

Still as a guide, the drying takes place at a temperature of between 120 and 170° C., when it is carried out at atmospheric pressure.

The temperatures used with vacuum dryers may be less than these values.

According to the invention, a film of vegetable oil HV is distributed on the wall of cylinder 1 before depositing thereon the thin layer to be dried.

This is carried out, in the example represented, by means of a spray line 5 equipped with discharge nozzles 50. The spray line overhangs the whole length of the cylinder.

It is placed upstream of the satellite roller 2, when the zone for depositing the material MH and the direction of rotation of roller 1 are considered.

Of course, the pressure for discharging the oil should be chosen such that the discharged particles are not sucked in by the hood before they are deposited on the wall.

Figure 2:
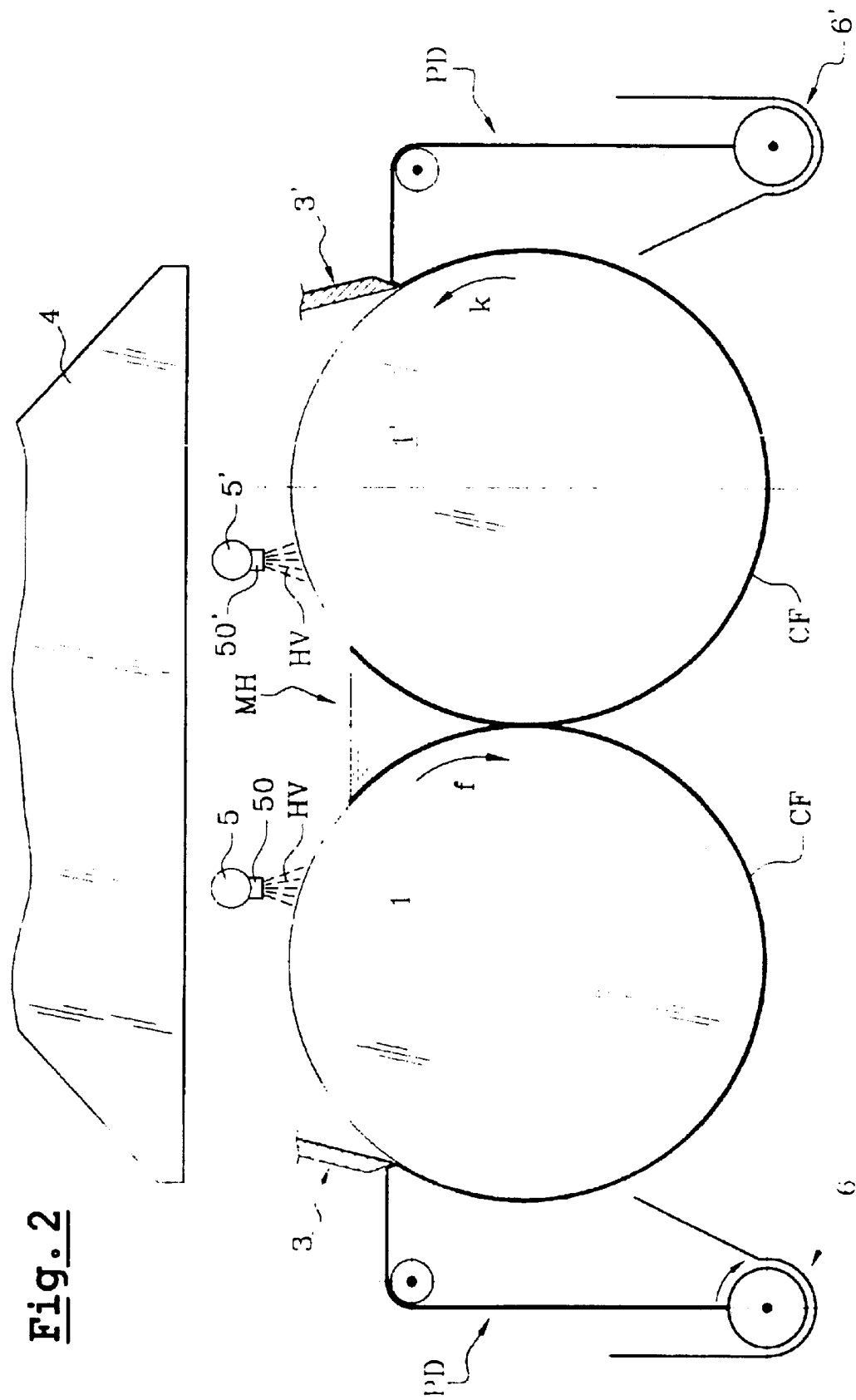
FIG. 2 is a diagram of a variant of the device of FIG. 1, with two rollers.

In the embodiment in FIG. 2, two chrome-plated press cylinders 1 and 1' with heated walls, placed side by side, with their axes parallel and situated in the same horizontal plane, are used.

The two cylinders rotate in opposite directions (arrows f and k), their generating lines being at a short distance from each other.

The material MH is poured between the two rollers 1 and 1'. It is laminated and forms a fine layer CF which is gradually dehydrated on the heated rollers.

Each roller 1, 1' is combined with a spray line 5, 5', respectively, equipped with nozzles 50, 50' of the same type as that described above.

As in the embodiment of FIG. 1, the dehydrated product is removed from the wall of each cylinder 1, 1' by means of a scraping roller 3, 3', respectively, and the dehydrated product PD is collected in a device 6, 6', respectively, with shredding and discharging screw.

We will now describe a few exemplary embodiments of production in accordance with the process according to the invention.

These manufacturings are carried out under the following conditions:

use of a heating cylinder of 10.9 $m^2$;

useful width of the cylinder: 2.3 m;

deposition of the oil by spraying;

spray line with 6 nozzles;

container pressure (supply line): 0.15 bar;

nozzle pressure: 0.30 bar;

the spraying is carried out during one revolution of the cylinder and then stopped during three revolutions, and so on;

oil used—commercial refined palm oil.

The other test parameters and the results obtained are grouped together in the table below:

production of a thicker film, hence better scraping;

absence of adhesion onto the blade during detachment;

absence of adhesion to the heating cylinder;

better carrying away of the mass, that is to say of the wet material waiting to be carried away, hence no sticking to the satellites;

same productivity (or even better than the current technique);

production of flakes from vegetables, in particular celery or spinach, not achievable with lecithin.

Of course, oils other than palm oil may also be suitable. This includes for example sunflower oil, rapeseed oil and the like.

If use is made of a cylinder having a useful surface area of 10.9 $m^2$ (as indicated above) revolving at a speed of between 2 and 4 rev/min (that is between 120 and 240 rev/h), this corresponds to lubricating between 1300 and 2600 $m^2$/h approximately, depositing between 100 and 150 g of oil per hour.

In the tests, the measured thickness of the film was 0.15 to 0.20 mm and the quantity of oil varied from about 10 to about 20 g of oil/hour/$m^2$ of wall.

It would still be within the scope of the invention if the vegetable oil is spread on the hot wall otherwise than by spraying.

In the case where the hot wall is a rotating cylinder (as in each of the two embodiments illustrated above), the oil may be deposited for example by coating with the aid of an oiling roller by pressing against the cylinder and revolving in the opposite direction thereto.

It should be noted that in such small doses, the vegetable oil is considered, from a regulatory point of view (directive 89/107/EEC) as a technological aid on the list of ingredients contained in the flakes obtained. There is no obligation to state it as such on the label placed on the packaging.

| Product | Formula (% on TDM) (1) | Cylinder rotation speed | Through-put (kg/h) (2) | Quantity of oil (%) (3) | Quantity produced (kg) (4) | Comments |
|---|---|---|---|---|---|---|
| Carrot | Carrot: 100% (+ ascorbic acid) | 40 sec/rev | 33 | 0.41 | 49 | very nice film, very easy drying |
| Celery | Celery: 43 Starch: 23 Glucose: 29 | 24 sec/rev | 38 | 0.40 | 105 | Easy drying whereas product usually difficult to make and containing a dose of only 24% celery |
| Celery | Celery: 75 | 24 sec/rev | 24.3 | 1.00 | 30.4 | Product impossible to make with lecithin |
| Orange | Orange: 41 Starch: 24 Sucrose Colouring: 17 | 24 sec/rev | 95 | 0.15 | 122 | No difficulty with drying |
| Onion | Onion: 40 Starch: 30 Glucose: 30 | 40 sec/rev | 60.3 | 0.17 | 223 | |

(1): percentages by weight relative to the total quantity of dry matter;
(2): output of flakes obtained;
(3): quantity of oil detected in the flakes, as a percentage by weight relative to the weight of flakes;
(4): total quantity of flakes obtained.

Micro-spraying of oil is used during the entire duration of the treatment. It makes it possible to obtain excellent detachment of the film and has many advantages compared with the incorporation of lecithin into the mixture:

better lubrication than lecithin;

much smaller dose than lecithin for better efficacy;

What is claimed is:

1. Process for producing a dehydrated food product from a wet plant material by drying said material in the form of a thin layer on a hot wall, comprising distributing a film consisting essentially of vegetable oil on said wall before depositing thereon the thin layer to be dried, this being without addition of lecithin.

2. Process according to claim 1, wherein said drying is carried out on the outer wall of at least one rotating cylinder.

3. Process according to claim 1, wherein the quantity of oil deposited is at most 1% by weight, relative to the weight of the dry matter.

4. Process according to claim 1, wherein said distributing of oil is carried out by coating the wall with the aid of a roller.

5. Process according to claim 1, wherein said distributing of oil is carried out by spraying.

6. Process according to claim 1, wherein the film of vegetable oil is distributed intermittently.

7. Process according to claim 1, wherein the vegetable oil is palm oil.

8. Process according to claim 1, wherein the wet plant material is a fruit purée, vegetable purée, or fruit and vegetable purée.

9. Process for producing a dehydrated food product from a wet plant material by drying said material in the form of a thin layer on a hot wall, comprising distributing on said wall a film exclusively consisting of vegetable oil at about 5 to 50 g of oil/hour/m$^2$ of wall before depositing thereon the thin layer to be dried, this being without addition of lecithin.

10. Process according to claim 1, wherein the quantity of oil deposited is at most 0.5% by weight, relative to the weight of the dry matter.

* * * * *